US012574599B2

(12) United States Patent
Steynfaardt et al.

(10) Patent No.: US 12,574,599 B2
(45) Date of Patent: Mar. 10, 2026

(54) METHOD AND SYSTEM FOR REDACTING UNDESIRABLE DIGITAL CONTENT

(71) Applicant: LIGHTHOUSE TECHNOLOGIES LIMITED, London (GB)

(72) Inventors: Stephan Steynfaardt, London (GB); Pieter Meyer Van Reenen, London (GB)

(73) Assignee: LIGHTHOUSE TECHNOLOGIES LIMITED, London (GB)

( * ) Notice: Subject to any disclaimer, the term of this patent is extended or adjusted under 35 U.S.C. 154(b) by 0 days.

(21) Appl. No.: 18/268,824

(22) PCT Filed: Dec. 20, 2021

(86) PCT No.: PCT/IB2021/062020
§ 371 (c)(1),
(2) Date: Jun. 21, 2023

(87) PCT Pub. No.: WO2022/137077
PCT Pub. Date: Jun. 30, 2022

(65) Prior Publication Data
US 2024/0080524 A1 Mar. 7, 2024

(30) Foreign Application Priority Data
Dec. 21, 2020 (GB) ..................................... 2020296

(51) Int. Cl.
*H04N 21/454* (2011.01)
*H04L 67/56* (2022.01)
*H04N 21/475* (2011.01)

(52) U.S. Cl.
CPC ......... *H04N 21/4542* (2013.01); *H04L 67/56* (2022.05); *H04N 21/454* (2013.01); *H04N 21/475* (2013.01)

(58) Field of Classification Search
CPC . H04N 21/4542; H04N 21/475; H04N 21/454
See application file for complete search history.

(56) References Cited

U.S. PATENT DOCUMENTS 8,700,409 B1 * 4/2014 Persson ................ H04N 21/475
704/278
8,843,953 B1 * 9/2014 Dang ................. H04N 21/4542
725/28

(Continued)

FOREIGN PATENT DOCUMENTS

CN 112016622 A 12/2020

OTHER PUBLICATIONS

International Search Report issued in App. No. PCT/IB2021/062020, dated Apr. 13, 2022, 3 pages.

*Primary Examiner* — Pinkal R Chokshi
(74) *Attorney, Agent, or Firm* — FisherBroyles, LLP; Jason P. Mueller

(57) ABSTRACT

A method and system for redacting digital content are disclosed. The system includes an identification server and an inspection engine. The server is configured to receive a content request originating from a user device and to identify a user account associated with the content request. The server is further configured to tag the content request with a restriction identifier which is indicative of a restriction level of a user of the user device. The engine is configured to analyse visual content forming part of digital content requested by way of the content request before the digital content is transmitted to the user device. A result of the analysis performed by the inspection engine is used to determine whether the visual content is undesirable based on the restriction parameter. If classified as undesirable, the digital content or part thereof is redacted or censored before transmission thereof to the user device.

14 Claims, 5 Drawing Sheets

(56)     References Cited

U.S. PATENT DOCUMENTS

| 11,665,399 | B2 * | 5/2023 | Pearce | ............... | H04N 21/4524 |
| | | | | | 725/28 |
| 2006/0047634 | A1 * | 3/2006 | Aaron | ................... | G06F 16/335 |
| 2013/0151346 | A1 * | 6/2013 | Schoen | ................. | G06Q 30/02 |
| | | | | | 705/14.66 |
| 2014/0029615 | A1 * | 1/2014 | Baldwin | ............. | H04L 67/5651 |
| | | | | | 370/392 |
| 2015/0058889 | A1 * | 2/2015 | Rathbun, II | ..... | H04N 21/47217 |
| | | | | | 725/38 |
| 2016/0323643 | A1 * | 11/2016 | Panchaksharaiah | ......................... | |
| | | | | | H04N 21/4753 |
| 2017/0046523 | A1 * | 2/2017 | Sathish | ................ | H04W 12/08 |
| 2018/0352301 | A1 * | 12/2018 | Tofighbakhsh | .... | H04N 21/2668 |
| 2020/0275158 | A1 * | 8/2020 | Gaur | ........................ | G06N 3/08 |
| 2021/0409825 | A1 * | 12/2021 | Meyer | ............. | H04N 21/26208 |
| 2022/0394318 | A1 * | 12/2022 | Sharma | ............. | H04N 21/4532 |

* cited by examiner

200

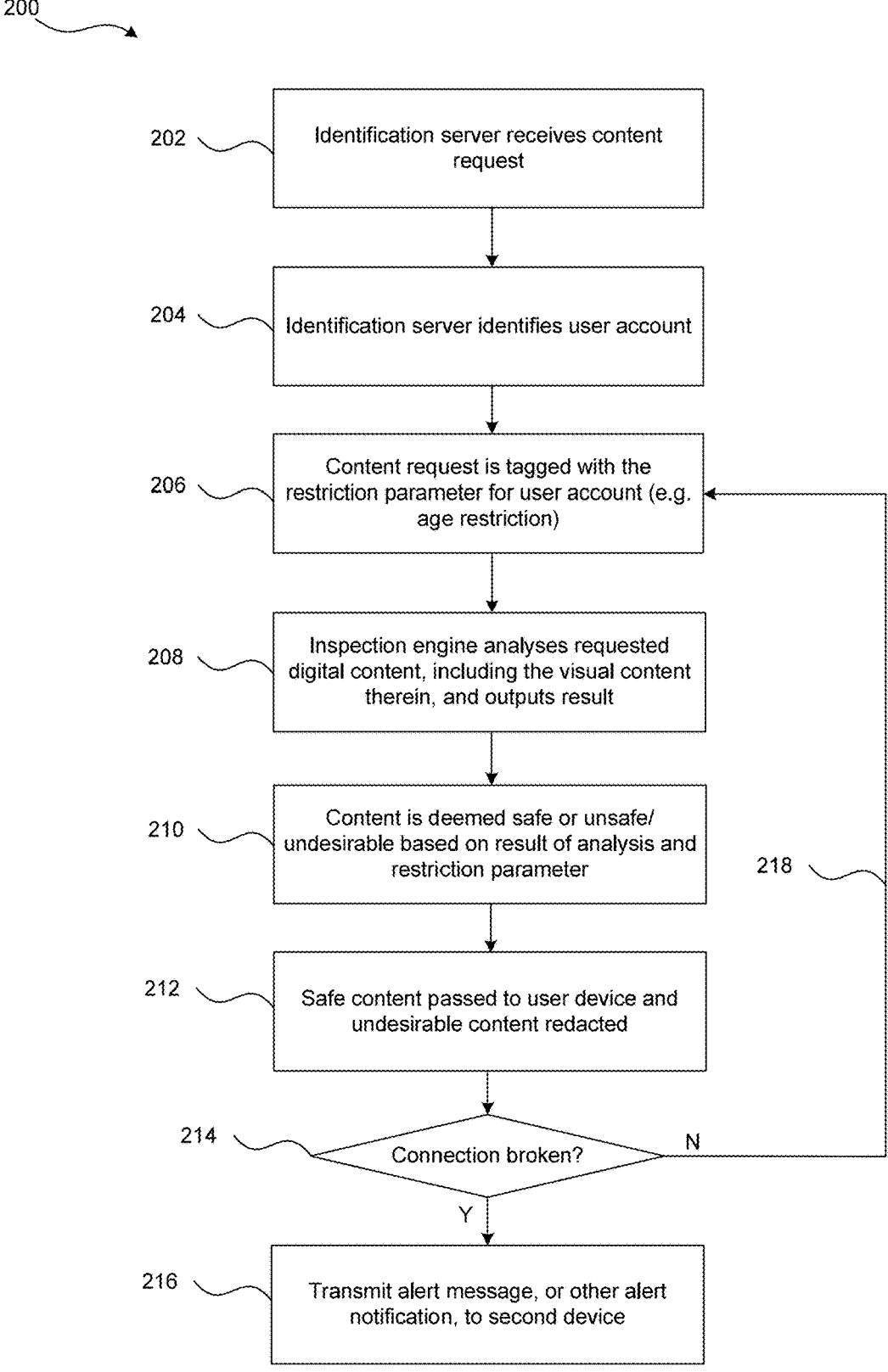

202 — Identification server receives content request

204 — Identification server identifies user account

206 — Content request is tagged with the restriction parameter for user account (e.g. age restriction)

208 — Inspection engine analyses requested digital content, including the visual content therein, and outputs result 210 — Content is deemed safe or unsafe/ undesirable based on result of analysis and restriction parameter 212 — Safe content passed to user device and undesirable content redacted 214 — Connection broken?

218

N

Y

216 — Transmit alert message, or other alert notification, to second device

METHOD AND SYSTEM FOR REDACTING UNDESIRABLE DIGITAL CONTENT

This patent application is a U.S. National Stage application of PCT/IB2021/062020 filed on Dec. 20, 2021, which in turn claims priority to United Kingdom Patent Application No. GB2020296.6, filed on Dec. 21, 2020, the disclosures of which are incorporated herein by reference in their entireties.

FIELD OF THE INVENTION

The invention relates to a computer-implemented method of redacting undesirable digital content, particularly (but not exclusively) internet content, and to a system for redacting such content. Embodiments of the invention provide a technological solution aimed at protecting persons, and particularly (but not exclusively) children, from inappropriate, harmful, offensive or other undesirable online content.

BACKGROUND TO THE INVENTION

Most people are exposed to digital content on a daily basis, at least some of which is delivered via the internet. One form of digital content is the textual, visual/graphic and/or audio content found online as part of a user's experience on a website or when using a web-based software application. This type of digital content is referred to herein as "internet content" and includes, among other things, text, images, sounds, stories, links, pop-ups, videos and animations.

The internet is fast becoming trusted as providing reliable and accurate information. Through the internet, people now have access to an almost endless supply of information and opportunity for interaction. Currently, more and more children are mastering the art of searching the internet and adults often disagree about whether or not to allow children to use the internet.

Although the internet can be useful in helping children to study, develop and learn the art of virtual communication, all of which have become important parts of life, it can also expose children to content that is inappropriate for their age. The internet, in general, is not always considered to be "safe" for children and there can be real risks and dangers for an unsupervised child.

Online services provide children with resources such as encyclopedias, current events coverage, and access to libraries and other valuable resources. Children often also play games and communicate with friends on social media platforms like Facebook, Twitter, Snapchat, TikTok, Instagram, and the like. The ability to "click" from one area to another and to respond to the posts of others appeal to a child's natural impulsivity and curiosity and needs for gratification or feedback.

Parents frequently teach their children not to talk to strangers, not to open the door if they are home alone, and not to give out information on the telephone to unknown callers. Parents also frequently monitor where their children go, who they play with, and what television shows, books, or magazines they are exposed to. However, many parents do not realise that the same level of guidance and supervision must be provided for a child's online experience. Parents cannot assume that their child will be protected by the supervision or regulation provided by online services.

Internet filters typically include software precluding users of a computing device (e.g. a desktop computer, laptop, mobile phone or tablet) from accessing certain applications or websites, or viewing certain a web page. They are largely used to block content considered inappropriate for specific users. These kinds of filters are widely used in public areas (e.g. libraries) and schools and to some extent in the workplace. Internet filters may be installed by anyone who maintains a network. Terms such as filtering, blocking, shutting down and censorship all come to mind when describing internet filtering. They all describe some part of the internet or some internet-based applications becoming inaccessible due to the content being deemed offensive, inappropriate, or dangerous.

Keeping offensive and objectionable content away from children is one of the most important uses of these filtering systems. Parents are generally aware of the need to apply internet content filters to material not appropriate for young children. However, it will be appreciated that internet filtering/blocking is not only applicable to children and is also applied to adults. For example, an employer may wish to block or restrict access to certain websites that are not appropriate for work (e.g. pornographic sites), have an adverse impact on employee performance/efficiency (e.g. social media) or are otherwise undesirable (e.g. possible scams or fraudulent activities). Accordingly, in the context of this specification, the term "undesirable digital content" should be interpreted broadly and is not limited to content that is inappropriate for children due to their age.

In terms of existing systems, content filtering/blocking generally works by using hardware or software-based solutions to establish rules about the types of sites that may be visited. Using keywords, context or other commonalities between sites and/or applications, content is grouped into categories. For example, categories may include sport, gambling, adult, streaming, shopping, social network, and the like. In terms of conventional functioning of these filtering systems, sites or pages falling into the undesirable categories may be blocked.

A drawback of existing systems is that they may fail to pick up undesirable digital content in the form of visual content, e.g. images or video, or in some cases audio content, especially when the undesirable content appears on a website, platform or application marked as "safe" by virtue of its general context or category. For instance, a child may have an internet-enabled device on which filtering is applied to block access to inappropriate websites, such as adult websites. However, the child may still have access to social networking applications like Facebook and Instagram, exposing the child to inappropriate visual content in the form of images and videos, e.g. images and/or videos of adults wearing little or revealing clothing, with the filtering system failing to identify the content as potentially harmful (due to being technically configured to allow access to these social networking applications). Existing systems of which the Applicant is aware focus mainly on the analysis of content type (category) and/or text, or a comparison of content with stored records, in order to determine whether the content is inappropriate, while lacking the technical capabilities required to consider visual content directly and determine, in real-time, whether the content is undesirable without having reference to content type, associated text, or comparable content. Similarly, existing content filtering systems may not necessarily preclude a user from clicking on an undesirable embedded link or pop-up containing undesirable digital content.

The present invention aims to address or alleviate the issues described above, at least to some extent, by providing an enhanced technical solution to the technical problems associated with existing systems.

SUMMARY OF THE INVENTION

According to the invention, broadly, there is provided a computer-implemented method of redacting undesirable digital content, the method comprising:

receiving, at an identification server, a content request originating from a user device;

identifying a user account associated with the content request;

tagging the content request with a restriction identifier which is indicative of a restriction parameter associated with a user of the user device, the user or user device being linked to the user account;

analysing, by an inspection engine communicatively coupled to the identification server, digital content requested by way of the content request before the digital content is transmitted to the user device, wherein the digital content includes visual content in the form of image and/or video content;

using a result of the analysis performed by the inspection engine to determine whether the digital content, or part thereof, is undesirable based on the restriction parameter; and if the digital content or part thereof is classified as undesirable, redacting the digital content or part thereof and causing a redacted or censored version of the digital content to be transmitted to the user device, or if the digital content or part thereof is not classified as undesirable, allowing the digital content to be transmitted to the user device substantially unchanged.

The restriction parameter may be a restriction level. The restriction level may, for instance, be an age-related restriction applied as a setting by a parent/guardian to a child's device. This is described in further detail below.

More specifically, according to a first aspect of the invention, there is provided a computer-implemented method of redacting undesirable digital content, the method comprising:

receiving, at an identification server, a content request originating from a user device;

identifying a user account associated with the content request;

tagging the content request with a restriction identifier which is indicative of a restriction level associated with a user of the user device, the user or user device being linked to the user account;

analysing, by an inspection engine communicatively coupled to the identification server, digital content requested by way of the content request before the digital content is transmitted to the user device, wherein the digital content includes visual content in the form of image and/or video content, wherein the inspection engine implements an artificial intelligence inspection model, and wherein the inspection engine is trained, using machine learning, to inspect the visual content in order to determine whether the visual content, or part thereof, is appropriate for the user based on the restriction level;

using a result of the analysis performed by the inspection engine to determine whether the visual content, or part thereof, is undesirable based on the restriction level, wherein the result of the analysis includes a rating associated with the visual content and a confidence level output by the inspection engine, and wherein the rating and the confidence level are taken into account in determining whether to redact the visual content or part thereof;

if the visual content or part thereof is classified as undesirable, redacting the visual content or part thereof and causing a redacted or censored version of the digital content to be transmitted to the user device, wherein redacting the visual content or part thereof includes replacing the image and/or video content, or parts thereof, with safe image and/or video content in the redacted or censored version, or if the visual content or part thereof is not classified as undesirable, allowing the digital content to be transmitted to the user device substantially unchanged.

The identification server may be a proxy server. The content request may be a web request, i.e. a request for internet content as defined above, the internet content being digital content which includes visual content.

The method may include establishing a connection between the user device and the identification server such that all web traffic is channeled through the identification server prior to reaching the user device. The connection may be established over a virtual private network (VPN). The method may include, in response to determining that the connection has been broken or is no longer active, transmitting an alert notification to a second device. The server may transmit the notification or cause it to be transmitted.

The identification server may be configured to identify the user and/or the user account based on an Internet Protocol (IP) address of the user device and/or based on user credentials such as a username and password submitted from the user device. The identification server may have access to one or more database in which account details of the user account are stored.

The identification server may be configured to retrieve the restriction level for the user of the user account/device from a database. The restriction level may be an identification age of the user. The method may include setting the user's identification age. Other restriction parameters may also be employed.

The method may include, after identifying the user account, tagging all subsequent content requests from the user device with the restriction identifier such that the restriction parameter and/or user account need only be identified once during a communication session. A tag may thus be used identify the user account or the restriction parameter to use on future requests. The restriction identifier may be any suitable identifier, preferably a secure identifier or token.

The inspection engine may be provided by an inspection or classification box. The inspection engine may be a computerised module or device implementing at least one artificial intelligence (AI) inspection model/algorithm. The inspection engine may be trained, using machine learning (ML), to assess or inspect the digital content, which may specifically include visual content, and/or to determine whether it is appropriate for a user associated with the user account based on the restriction parameter, e.g. based on the user's age. The inspection engine may apply a suitable AI model when assessing the digital/visual content.

The inspection engine may be operable to receive the digital content, e.g. internet content including visual content, sought to be accessed by a user from the user device, in use. The method may thus include passing all web traffic for the user device through the inspection engine prior to making it available to the user on the user device.

The user device may be any suitable communication device such as a computer, a tablet or a mobile phone.

As mentioned above, the digital content may specifically include visual content in the form of image and/or video content. The method may include inspecting visual content forming part of the digital content and, if the inspection engine determines that the visual content is undesirable for the user of the user device, the visual content or part thereof may be redacted or censored. Redaction may include replacing the image and/or video content, or parts thereof, with safe image and/or video content in the redacted or censored version. It is envisaged that the inspection engine may also be configured to analyse digital content in the form of audio and to censor, redact and/or block the audio if the analysis reveals that the audio is not desirable for the user account.

Redaction may thus include replacing content deemed undesirable with "safe" content. For instance, after visual content in the form of an image is redacted, or as part of the redacting process, the image may be replaced with a "safe" image, e.g. a black or blank image and/or an image with a message stating that content has been redacted, or any other image which is not undesirable or inappropriate. Similarly, if a specific frame or frames of video content are deemed undesirable, or if an entire video is deemed undesirable, it may be redacted by replacing it with "safe" content, e.g. replacing the undesirable frame/s or portion/s of the video with a black or blank screen, and/or a screen with a message stating that content has been redacted. The terms "safe image", "safe video" and "safe content" should thus be interpreted broadly and can include any "alternative" content that is not deemed to be undesirable or unsafe, etc., and thus injected into the original content to replace the original content or parts thereof.

The inspection engine may be configured to output the result of the analysis.

The result may include one or both of a rating associated with the visual content and a confidence level output by the inspection engine.

The rating may be a rating given to the visual content, e.g. a rating/score indicative of its age-appropriateness (e.g. appropriateness score or appropriateness rating (for instance "Parental Guidance/PG", "Age 13", "Age 16", or the like), a rating/score identifying it as undesirable, or a rating/score indicative of potentially harmful or unsafe content in the visual content. The visual content may only be redacted if predefined rating criteria are met.

The confidence level may be indicative of the degree or level of certainty that the visual content or part thereof is undesirable, or may be undesirable, e.g. a "certainty percentage" allocated by the inspection engine indicative "how certain" the inspection engine is of the content and/or whether/how inappropriate the content is.

The identification server or another component/module may be configured to determine whether the digital/visual content is undesirable based on the result.

The result of the analysis, e.g. the rating (e.g. appropriateness score or rating) and/or or confidence level, may be taken into account in determining whether to redact the digital content or part thereof.

Further, according to the invention, broadly, there is provided a system for redacting undesirable digital content, the system comprising:

an identification server which is configured to receive a content request originating from a user device and to identify a user account associated with the content request, wherein the identification server is further configured to tag the content request with a restriction identifier which is indicative of a restriction parameter associated with a user of the user device, the user or user device being linked to the user account; and an inspection engine communicatively coupled to the identification server, the inspection engine being configured to analyse digital content requested by way of the content request before the digital content is transmitted to the user device, wherein the digital content includes visual content in the form of image and/or video content, the inspection engine or the identification server being configured to use a result of the analysis performed by the inspection engine to determine whether the digital content, or part thereof, is undesirable based on the restriction parameter, such that if the digital content or part thereof is classified as undesirable, the digital content or part thereof is redacted and a redacted or censored version of the digital content is transmitted to the user device, or alternatively, if the digital content or part thereof is not classified as undesirable, the digital content is allowed to be transmitted to the user device substantially unchanged.

More specifically, according to a second aspect of the invention, there is provided a system for redacting digital content, the system comprising:

an identification server which is configured to receive a content request originating from a user device and to identify a user account associated with the content request, wherein the identification server is further configured to tag the content request with a restriction identifier which is indicative of a restriction level of a user of the user device, the user or user device being linked to the user account; and an inspection engine communicatively coupled to the identification server, the inspection engine being configured to analyse digital content requested by way of the content request before the digital content is transmitted to the user device, wherein the digital content includes visual content in the form of image and/or video content, wherein the inspection engine implements an artificial intelligence inspection model, and wherein the inspection engine is trained, using machine learning, to inspect the visual content in order to determine whether the visual content or part thereof is appropriate for the user based on the restriction level, the inspection engine or the identification server being configured to use a result of the analysis performed by the inspection engine to determine whether the visual content, or part thereof, is undesirable based on the restriction level, wherein the result of the analysis includes a rating associated with the visual content and a confidence level output by the inspection engine, and wherein the rating and the confidence level are taken into account in determining whether to redact the visual content or part thereof, such that if the visual content or part thereof is classified as undesirable, the visual content or part thereof is redacted and a redacted or censored version of the digital content is transmitted to the user device, or alternatively, if the visual content or part thereof is not classified as undesirable, the digital content is allowed to be transmitted to the user device substantially unchanged, wherein redacting the visual content or part thereof includes replacing the image and/or video content, or parts thereof, with safe image and/or video content in the redacted or censored version.

As mentioned above, the restriction level may be based on the user's age and the digital content may be internet content, e.g. visual content on the internet. The inspection engine may thus be operable to investigate and classify internet content, and specifically visual content, based on a user's identification age.

In an embodiment of the invention, the system may thus be operable to classify the digital content, specifically visual content therein, as either being safe or unsafe according to a restriction level such as the identification age of the user. In such an embodiment, the system is operable to display the digital content deemed safe unchanged on the user device, in use. Further, the system is operable to change the digital content deemed as unsafe by displaying a censored or redacted (e.g. "safe") version thereof.

A user's identification age may be programmed into the system by the user or another user responsible for the user. The identification server may be operable to securely identify the identification age of the user requesting the digital content, in use.

In an embodiment of the invention, the identification server is operable to tag digital content such as internet content according to the identification age of the user. In such an embodiment, said content tagging may be provided in the example form of adding a restriction identifier or other secure identifier to the internet content.

In an embodiment of the invention, the system includes one or more databases operable to securely store and protect a user's personal information, in use. The personal information may include account details such as (but not limited to) identity number, e-mail address, mobile number, age of the user, devices linked to the user account, details of user managing the user account, etc.

In accordance with a third aspect of the invention, there is provided a computer program product for redacting digital content, the computer program product comprising at least one computer-readable storage medium having program instructions embodied therewith, the program instructions being executable by at least one computer to cause the at least one computer to carry out the method substantially as described above. The computer-readable storage medium may be a non-transitory storage medium.

BRIEF DESCRIPTION OF THE DRAWINGS

The invention will now be further described, by way of example, with reference to the accompanying drawings. In the drawings:

FIG. 3 is a flow diagram illustrating certain steps and processes employed in a method of redacting digital content, in accordance with an embodiment of the invention;

DETAILED DESCRIPTION WITH REFERENCE TO THE DRAWINGS

The following description of the invention is provided as an enabling teaching of the invention, is illustrative of the principles of the invention and is not intended to limit the scope of the invention. It will be understood that changes can be made to the embodiment/s described and depicted, while still attaining beneficial results of the present invention. Furthermore, it will be understood that some benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention.

Figure 1:
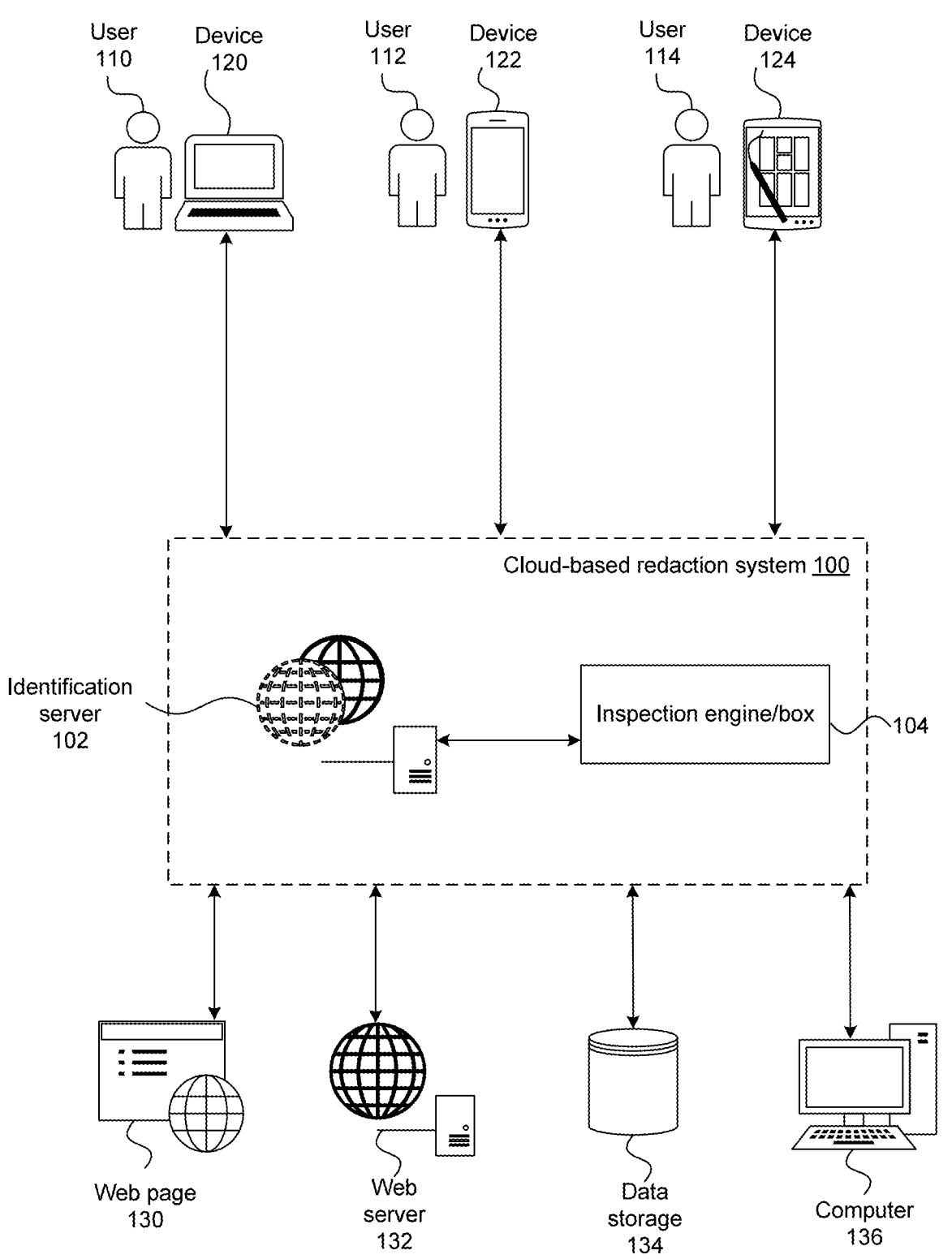
FIG. 1 is a schematic diagram of a system for redacting digital content, in accordance with an embodiment of the invention.

In FIG. 1, an embodiment of a cloud-based system for redacting internet content is generally described with reference to numeral 100. The cloud-based redaction system of FIG. 1 is simply referred to as the "system 100" below for ease of reference. In this example, the system 100 is specifically configured to classify content as safe or unsafe (undesirable) based on the age of a user trying to access the content. The aim is thus to protect children from inappropriate, harmful, offensive or other undesirable online content. The restriction level is thus a user's age in this embodiment. However, it will be appreciated that other restriction parameters may be employed without departing from the scope of the invention, e.g. checking whether content is appropriate or inappropriate for a user logged into a work computer (often referred to as "safe for work" or "not safe for work").

Furthermore, in this embodiment the system 100 is specifically configured to analyse digital content in the form of visual content, including images and/or video content.

Broadly speaking, the system 100 is used to monitor visual content in real-time, to rate/score and classify the content as allowable or undesirable, and to redact/block undesirable content using customised machine learning and artificial intelligence techniques. The system 100 may inject/replace the visual content with "alternative content" based on rating criteria.

In this embodiment, the system 100 is cloud-based and provides an internet content monitoring and censoring service. However, alternative embodiments, such as embodiments in which some of the components of the system 100 run on, for instance, "Docker" instances on the infrastructure of a client using the service, may be employed.

The system 100 includes a proxy server referred to as an identification server 102, and also includes an AI-box referred to as an inspection engine 104 which is communicatively coupled to the server 102. Multiple users 110, 112, 114 can connect to the system 100, typically through a VPN connection, using suitable communication devices 120, 122, 124. Various types of devices can be used, as shown in FIG. 1. In use, a software application may be installed on the devices 120, 122, 124 and a user account may be created for each user 110, 112, 114. Alternatively, a parent may create a user account and link that user account to the device of a child so as to manage that device. More than one user and user device may thus be associated with a specific user account. Typically, the holder or manager of the user account sets age restrictions for each user and/or user device on the user account. Online content will then be restricted according to the age limit on those devices and/or associated with each particular user (the age limit being the "restriction level").

The system 100 allows the person managing the user account to set a restriction parameter in the form of a restriction level associated with the user account. This may be a stickiness level, score or rating, e.g. correlated with movie poster ratings to make it easier for users: "A", "10", "13", "16", and the like. When the user device 120, 122, 124 submits a content request, the server 102 identifies the relevant user account and retrieves a "restriction parameter" or "restriction level" of the user using the user account, e.g. "13".

Each time one of the devices 120, 122, 124 requests digital content from the internet, e.g. from a web page 130, web server 132, data storage 134, or any other computer 136 or device, the content request is sent via the identification server 102 such that the system 100 can first determine whether the requested content, and specifically the visual content forming part of the requested content, is appropriate based on the age of the user using the device 120, 122, 124. The server 102 may thus be seen as similar to a man-in-the-middle (MITM) proxy which can relay and, if necessary, alter communications sent between a user device and an internet resource.

In other words, the system 100 may be configured to determine a rating or score for the content (or parts thereof such as visual parts), e.g. the age-appropriateness rating or age-appropriateness score of the content, and then compare the score/rating for the content to the relevant user's restriction level, and only permit the user to view or access the content (or parts thereof) if the score/rating does not exceed the restriction level.

In order to analyse the digital content, the inspection engine 104 is trained using machine learning. The engine 104 may be trained automatically to classify various types of content, such as text, images, videos, stories, structured and unstructured data and appropriate data may be used to build AI models running on the engine 104. In this embodiment, and as mentioned above, the engine 104 is specifically trained to directly analyse visual content irrespective of context or internet content category/type, thereby to ensure that undesirable visual content is redacted even if the broader category/content/type associated with the internet content (e.g. its text or web page type) is not unsafe or inappropriate per se.

In this example, in order to classify visual content as undesirable, the model was built to allow for multiple skin tones and low light conditions. The model was trained on multiple sets of images:

a) SFW (safe for work)—Images that are safe to view
   b) NSFW (not safe for work)—Images containing nudity
   c) PG (parental guidance)—Images containing people in swimwear
   d) Gore—Images containing gore Offensive or undesirable content that the system 100 is exposed to on a daily basis via multiple devices, may serve as learning material that allows the engine 104 to improve its ability to correctly classify and restrict content over time.

In this example embodiment, the engine 104 analyses not only text and web page context, but visual content and then outputs a result. The result includes an indication of what the visual content contains (e.g. an image that is NSFW or PG, in other words a rating or score for the visual content) along with a confidence level. The system 100 is further configured to redact/modify visual content which is not appropriate for a specific user and transmit a redacted/censored version of the content to that user.

Figure 2:
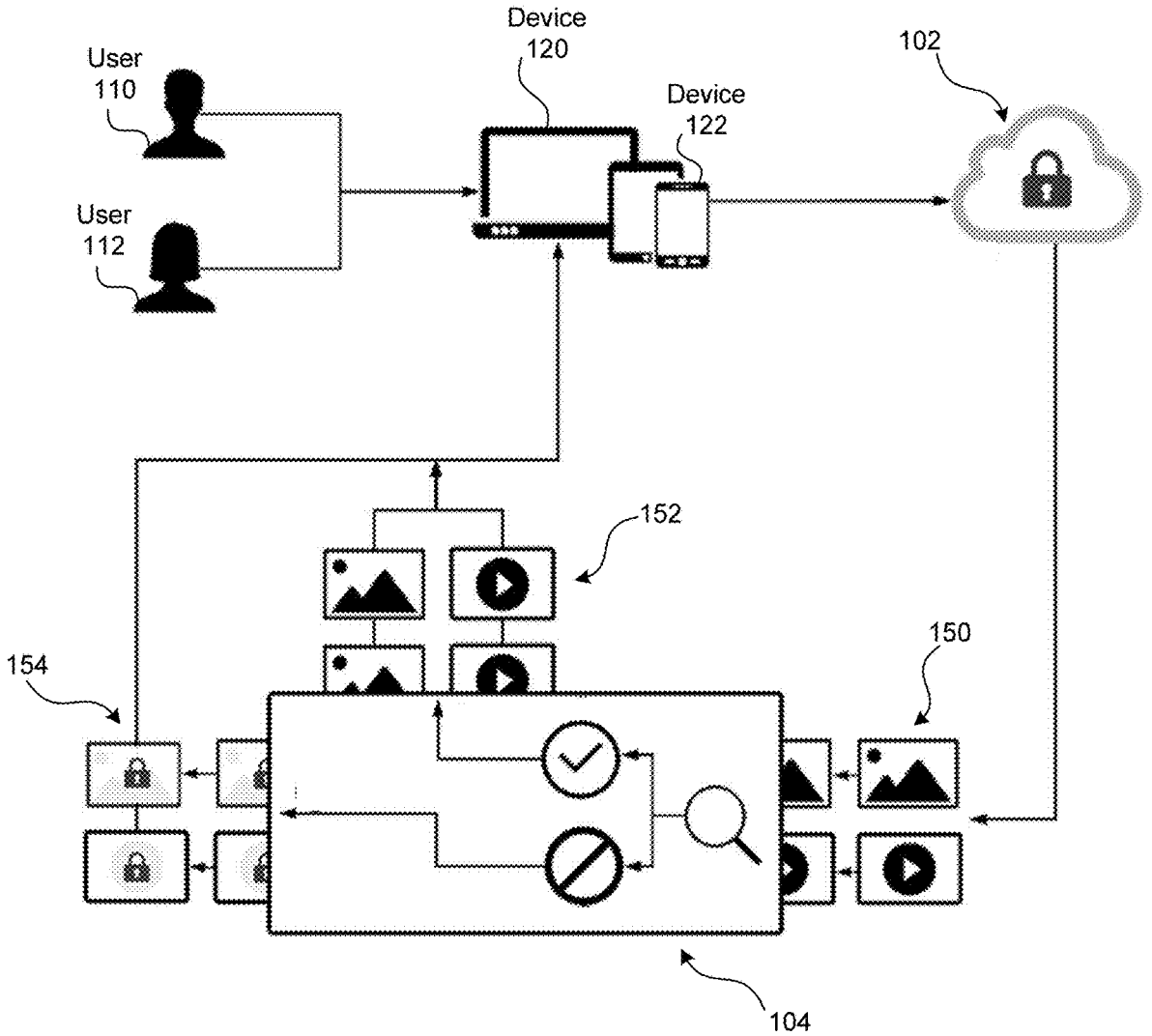
FIG. 2 is another schematic diagram of the system of FIG. 1, illustrating parts of a process flow used in a method of redacting digital content, in accordance with an embodiment of the invention.

Turning now to FIGS. 2 and 3, an example process according to the invention is described. In this example, the user 110 and the user 112 are referred to. The user 110 is a boy, aged 14, who uses the device 120 to access Instagram. The user 112 is a girl, aged 11, who uses the device 122, also to access Instagram.

Both users 110, 112 are registered on the system 100 as described above and connected to the system 100 over a VPN connection. Each user 110, 112 and/or their device 120, 122 is linked to a user account with the system 100. Any suitable connection (e.g. VPN) and firewall rules may be used to funnel all web traffic (content requests) through the server 102.

The system 100 may be configured such that a second device (e.g. a parent's device) is notified if the VPN connection is broken or lost. In other words, if at any stage during the process the connection is broken the parent's device may be notified by way of an alert message. This enhanced the safety and effectiveness of the system 100. This is illustrated by blocks 214 and 216 in FIG. 2.

In this example, the system 100 already has access to or stores the age of each user 110, 112.

Figure 4:
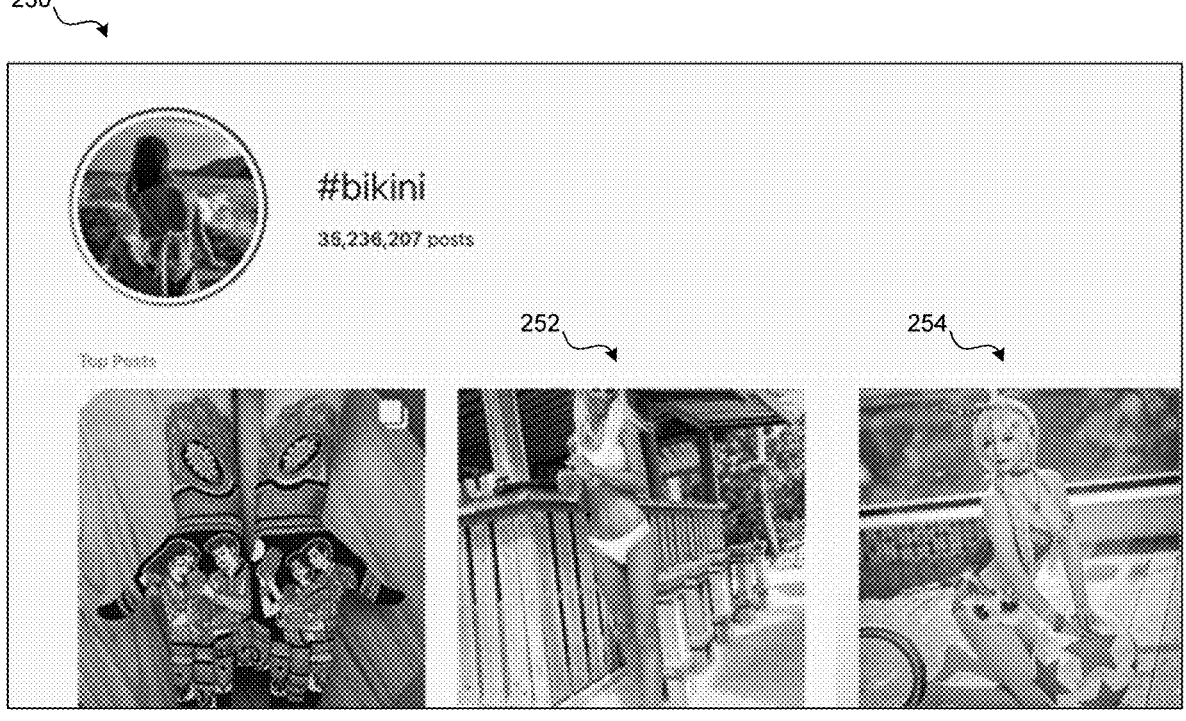
FIG. 4 is an exemplary screenshot illustrating digital content prior to redaction.
Figure 5:
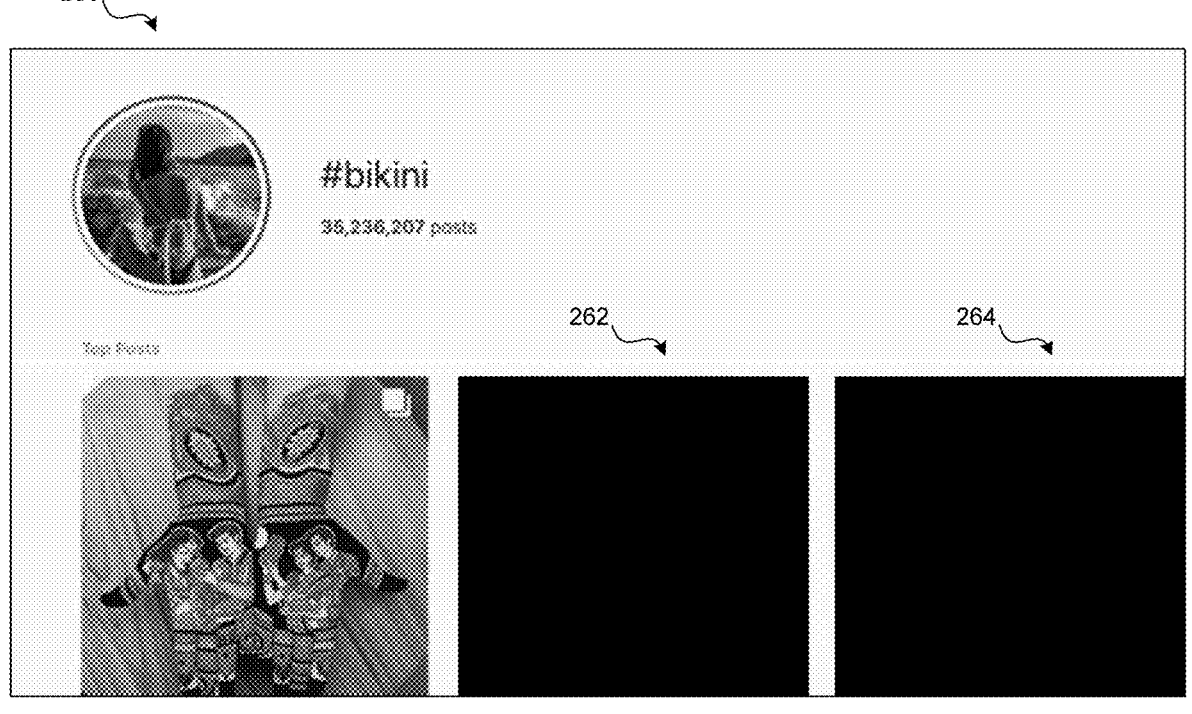
FIG. 5 is an exemplary screenshot illustrating digital content post-redaction.
Figure 6:
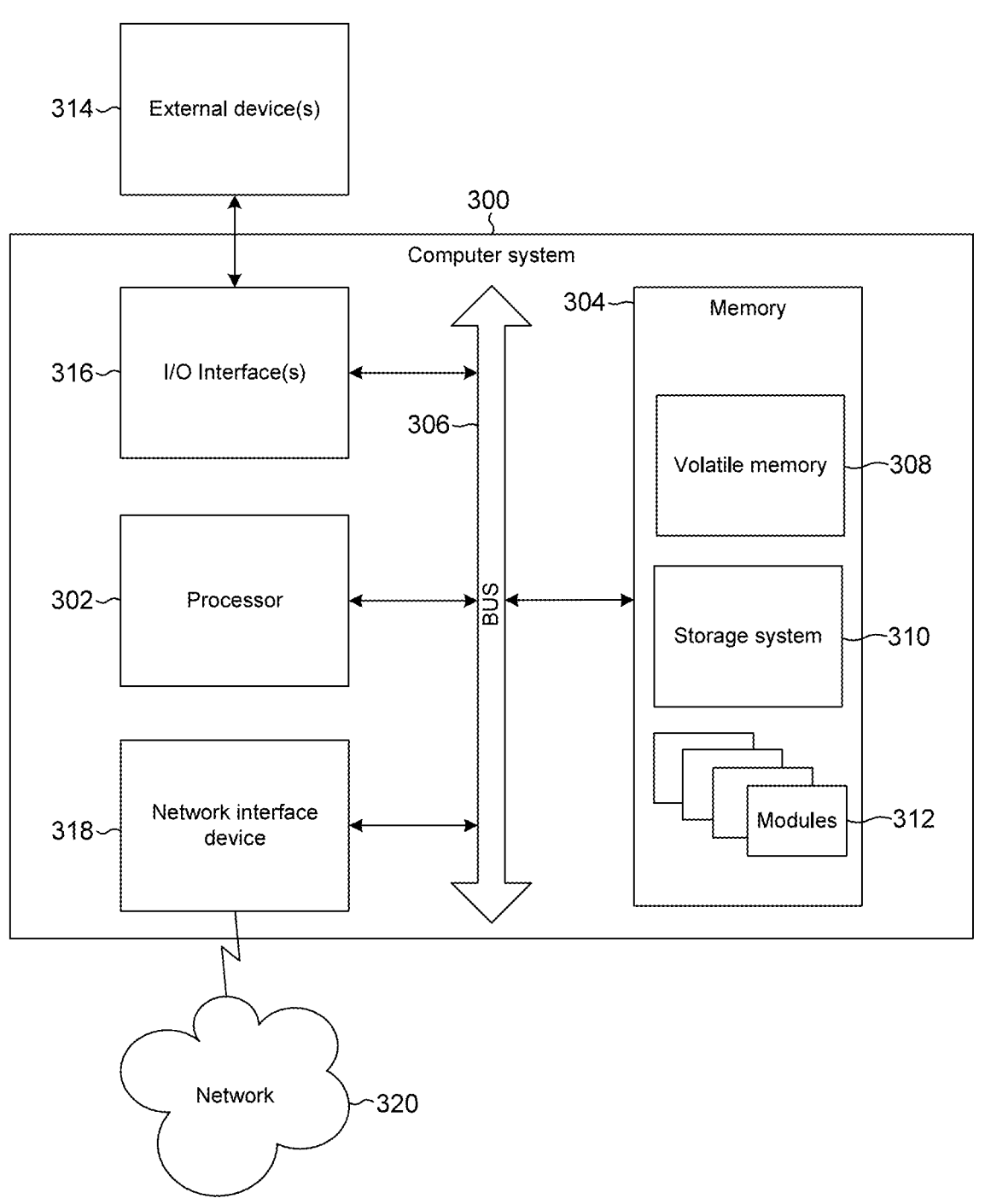
FIG. 6 is a block diagram of an exemplary computer system capable of executing a computer program product to provide functions and/or actions according to at least some aspects of the invention.

For purposes of this example, it is assumed that both users 110, 112 search the hashtag "#Bikini" on Instagram (see FIGS. 4 and 5). In response to receiving web requests from the devices 120, 122 of the users 110, 112, the server 102 identifies the user account associated with each request (see stages 202 and 204 in the block diagram 200 of FIG. 3).

In this embodiment, the server 102 accessed a database to check the IP address and username and password submitted from the each device 120, 122 and matches that with the appropriate user account on the system 100. Typically, when logging into the software application providing the redaction service, the relevant user must provide a username and password, after which the server 102 considers both this and the IP address to identify the user and filter content based on the "preferences"/restriction level associated with the user.

The web request from each device 120, 122 is tagged with a suitable restriction identifier (stage 206 in FIG. 3). In this embodiment, the server 102 tags each request with a secure identifier which is indicative of the identification age of the user 110, 112.

This allows the inspection engine 104 to know the age restriction to classify each content request against. Typically, once a device has been identified as being associated with a particular user or user account during a communication session, the server 102 tags all subsequent web requests from that device with the relevant secure identifier such that the restriction parameter (age), user or user account need only be identified once during a communication. The secure identifier may be a token which includes data indicative of the age of the user 110, 112, thereby obviating the need for the server 102 to re-check the age with each incoming request session (see the arrow 218 which illustrates that monitoring and inspection is a continuous process once the user has been identified). Then, the requested internet content (see numeral 150 in FIG. 2) is retrieved and first sent to the inspection engine 104 before it is made available to the devices 120, 122. As described above, the inspection engine 104 analyses the content to determine whether it, and particular the visual content forming part of the content, is appropriate for the users 110, 112 uses the AI model/s running on the engine 104 (stage 208 in FIG. 3).

In this example, the inspection engine 104 outputs a score or rating in respect of each visual element in the digital content. Refer, for instance, to the screenshot 250 of FIG. 4. Based on the score or rating given for each image in the digital content, the inspection engine 104 may determine that all of the images are safe for a user aged 14, but that the images 252 and 254 are unsafe for users below age 13 due to the level/degree of exposed skin, body parts detected, etc. (stage 210). Accordingly, all of the content may be passed through to the user device 120 of the user 110 as the user is 14 years old, while two of the images may be redacted before sending the content to the user device 122 of the user 112, as the user is only 11 years old, as indicated by numerals 262 and 264 in the screenshot 260 of FIG. 5. Refer, also, to FIG. 2 which schematically illustrates the difference between the visual (images and video) content transmitted to the user 110 (blocks 152) and the user 112 (blocks 154). In other words, the two users 110, 112 are trying to view the same web content, but the age restriction placed on the user 112 does not allow that user 112 to see parts of the web content as those parts are deemed to be undesirable and thus redacted.

In this way, the inspection engine 104 may receive and inspect all web traffic before it reaches the users using the service, with "safe" content passed through to each user device based on the relevant restriction parameter while unsafe content is redacted/censor (stage 212 in FIG. 3). The system 100 thus essentially "listens" for any incoming content, particularly visual content, but also in some embodiments for other elements such as text, categories, context, links and pop-ups, and requests the AI model/s running on the system 100 to inspect each element. The system 100 determines, based both on the result of the inspection and the user's restriction level, whether the element can be passed through to the user.

The term "redact" should be interpreted broadly. In the example of FIG. 5, the undesirable images are simply blacked out to form safe images, but numerous other techniques may be employed. For instance, the image may be replaced with another image which is an alternative and "safe" image and/or a message may be included to the effect that the content has been redacted/censored for the user's safety.

The AI model may return a confidence level of, say, between 0 and 1, indicting how "certain" it is that an image contains something undesirable, such as nudity, gore, or the like. In some cases the system 100 may be configured only to block/redact an image if the confidence level is above a certain confidence score/threshold. Rating criteria may thus include, for instance, redacting if the visual content has a certain rating/score (e.g. above 13 for a child with a "13" restriction level) and if the model/engine returns a confidence level of more than, say, 80%.

It will be evident from the above that embodiments of the invention may provide numerous advantages. For example, the system 100 does not merely considers a web page as a whole or its context or category, but inspects individual elements including images and video. The system 100 is trained using machine learning to determine, with a high degree of certainty, that certain content is safe/unsafe.

While the above examples focus on the protection of children based on their age, embodiments of the invention may be used in other applications. For instance, the system 100 may be used in the workplace to detect potentially fraudulent or other unsafe content and redact the content accordingly prior to allowing employees to view the content.

The techniques described above may be implemented in or using one or more computer systems, such as the computer system 300 shown in FIG. 3. The computer system 300 may be or include any suitable computer or server. The system 100 or any of the devices 120, 122, 124 may include such a computer system 300. The computer system 300 may be implemented in distributed cloud computing environments where tasks are performed by remote processing devices that are linked through a communications network. In a distributed cloud computing environment, program modules executed by the computer system 300 may be located both locally and remotely.

In the example shown in FIG. 3, the computer system 300 has features of a general-purpose computer. These components may include, but are not limited to, at least one processor 302, a memory 304 and a bus 306 that couples various components of the system 300 including the memory 304 to the processor 302. The bus 306 may have any suitable type of bus structure. The computer system 300 may include one or more different types of readable media, such as removable and non-removable media and volatile and non-volatile media.

The memory 304 may thus include volatile memory 308 (e.g. random access memory (RAM) and/or cache memory) and may further include other storage media such as a storage system 310 configured for reading from and writing to a non-removable, non-volatile media such as a hard drive. It will be understood that the computer system 300 may also include or be coupled to a magnetic disk drive and/or an optical disk drive (not shown) for reading from or writing to suitable non-volatile media. These may be connected to the bus 306 by one or more data media interfaces.

The memory 304 may be configured to store program modules 312. The modules 312 may include, for instance, an operating system, one or more application programs, other program modules, and program data, each of which may include an implementation of a networking environment. The components of the computer system 300 may be implemented as modules 312 which generally carry out functions and/or methodologies of embodiments of the invention as described herein. It will be appreciated that embodiments of the invention may include or be implemented by a plurality of the computer systems 300, which may be communicatively coupled to each other.

The computer system 300 may operatively be communicatively coupled to at least one external device 314. For instance, the computer system 300 may communicate with external devices 314 in the form of a modem, keyboard and display. These communications may be effected via suitable Input/Output (I/O) interfaces 316.

The computer system 300 may also be configured to communicate with at least one network 320 (e.g. the Internet or a local area network) via a network interface device 318/network adapter. The network interface device 318 may communicate with the other elements of the computer system 310, as described above, via the bus 306.

The components shown in and described with reference to FIG. 3 are examples only and it will be understood that other components may be used as alternatives to or in conjunction with those shown.

Aspects of the present invention may be embodied as a system, method and/or computer program product. Accordingly, aspects of the present invention may take the form of hardware, software and/or a combination of hardware and software that may generally be referred to herein as "components", "units", "modules", "systems", "elements", or the like.

Furthermore, aspects of the present invention may take the form of a computer program product embodied in one or more computer-readable storage medium having computer-readable program code embodied thereon. A computer-readable storage medium may, for instance, be an electronic, magnetic, optical, electromagnetic, infrared, or semiconductor system, apparatus, or device, or any suitable combination of the above. In the context of this specification, a computer-readable storage medium may be any suitable medium capable of storing a program for execution or in connection with a system, apparatus, or device. Program code/instructions may execute on a single device, on a plurality of devices (e.g., on local and remote devices), as a single program or as part of a larger system/package.

The present invention may be carried out on any suitable form of computer system, including an independent computer, mobile device/s and/or processors participating on a network of computers. Embodiments/aspects of the present invention may be carried out on a mobile device and the term "computer" should thus be interpreted sufficiently broadly to include a mobile communication device, and the term "computer-readable" should be interpreted to include mobile device readable code, storage, etc. Therefore, computer systems programmed with instructions embodying methods and/or systems disclosed herein, computer systems programmed to perform aspects of the present invention and/or media that store computer-readable instructions for converting a general purpose computer, mobile device, or the like, into a system based upon aspects of the present invention, may fall within the scope of the present invention. The term "computer-implemented" should also be interpreted broadly and may specifically include methods, processes and/or techniques implemented by or on mobile devices.

Chart(s) and/or diagram(s) included in the figures illustrate examples of implementations of one or more system, method and/or computer program product according to one or more embodiment(s) of the present invention. It should be understood that one or more blocks in the figures may represent a component, segment, or portion of code, which comprises one or more executable instructions for implementing specified logical function(s). In some alternative implementations, the actions or functions identified in the blocks may occur in a different order than that shown in the figures or may occur concurrently.

It will be understood that blocks or steps shown in the figures may be implemented by system components or computer program instructions. Instructions may be provided to a processor of any suitable computer or other apparatus such that the instructions, which may execute via the processor of the computer or other apparatus, establish or generate means for implementing the functions or actions identified in the figures.

The invention claimed is:

1. A computer-implemented method of redacting undesirable digital content, the method comprising:

establishing a connection between the user device and an identification server such that all web traffic is channelled through the identification server prior to reaching the user device, including passing all web traffic for the user device through an inspection engine prior to making it available to a use of the device, the inspection engine being communicatively coupled to the identification server;

receiving, at the identification server, a content request originating from the user device;

identifying a user account associated with the content request;

tagging the content request with a restriction identifier which is indicative of a restriction level associated with a user of the user device, the user or user device being linked to the user account;

analysing, by the inspection engine, digital content requested by way of the content request before the digital content is transmitted to the user device, wherein the digital content includes visual content in the form of image and/or video content, wherein the inspection engine implements an artificial intelligence inspection model, and wherein the inspection engine is trained, using machine learning, to inspect the visual content in order to determine whether the visual content, or part thereof, is appropriate for the user based on the restriction level;

using a result of the analysis performed by the inspection engine to determine whether the visual content, or part thereof, is undesirable based on the restriction level, wherein the result of the analysis includes a rating associated with the visual content and a confidence level output by the inspection engine, and wherein the rating and the confidence level are taken into account in determining whether to redact the visual content or part thereof;

if the visual content or part thereof is classified as undesirable, redacting the visual content or part thereof and causing a redacted or censored version of the digital content to be transmitted to the user device, wherein redacting the visual content or part thereof includes replacing the image and/or video content, or parts thereof, with safe image and/or video content in the redacted or censored version, or if the visual content or part thereof is not classified as undesirable, allowing the digital content to be transmitted to the user device substantially unchanged.

2. The method according to claim 1, wherein the identification server is a proxy server and the content request is a web request.

3. The method according to claim 2, which includes, in response to determining that the connection has been broken or is no longer active, transmitting an alert notification to a second device.

4. The method according to claim 1, wherein the identification server is configured to identify the user and/or user account based on an Internet Protocol (IP) address of the user device and/or based on user credentials submitted from the user device.

5. The method according to claim 1, wherein the restriction level is an identification age of the user and wherein the method includes determining whether the visual content, or part thereof, is undesirable based on the identification age.

6. The method according to claim 1, which includes, after identifying the user account, tagging all subsequent content requests from the user device with the restriction identifier.

7. The method according to claim 1, further comprising:

training the inspection engine using machine learning on datasets comprising digital content, and wherein the inspection engine dynamically improves its ability to classify digital content by adapting its analysis and decision-making based on exposure to new content during operational use.

8. A system for redacting undesirable digital content, the system comprising:

an identification server which is configured to establish a connection with the user device such that all web traffic is channelled through the identification server prior to reaching the user device, and wherein the identification server is configured to receive a content request originating from a user device and to identify a user account associated with the content request, wherein the identification server is further configured to tag the content request with a restriction identifier which is indicative of a restriction level of a user of the user device, the user or user device being linked to the user account; and an inspection engine communicatively coupled to the identification server, wherein all web traffic for the user device is passed through the inspection engine prior to making it available to the user on the user device, the inspection engine being configured to analyse digital content requested by way of the content request before the digital content is transmitted to the user device, wherein the digital content includes visual content in the form of image and/or video content, wherein the inspection engine implements an artificial intelligence inspection model, and wherein the inspection engine is trained, using machine learning, to inspect the visual content in order to determine whether the visual content or part thereof is appropriate for the user based on the restriction level, the inspection engine or the identification server being configured to use a result of the analysis performed by the inspection engine to determine whether the visual content, or part thereof, is undesirable based on the restriction level, wherein the result of the analysis includes a rating associated with the visual content and a confidence level output by the inspection engine, and wherein the rating and the confidence level are taken into account in determining whether to redact the visual content or part thereof, such that if the visual content or part thereof is classified as undesirable, the visual content or part thereof is redacted and a redacted or censored version of the digital content is transmitted to the user device, or alternatively, if the visual content or part thereof is not classified as undesirable, the digital content is allowed to be transmitted to the user device substantially unchanged, wherein redacting the visual content or part thereof includes replacing the image and/or video content, or parts thereof, with safe image and/or video content in the redacted or censored version.

9. The system according to claim 8, wherein the identification server is a proxy server and the content request is a web request.

10. The system according to claim 9, wherein the identification server is configured to transmit an alert notification to a second device in response to determining that the connection has been broken or is no longer active.

11. The system according to claim 8, wherein the identification server is configured to identify the user and/or user account based on an Internet Protocol (IP) address of the user device and/or based on user credentials submitted from the user device.

12. The system according to claim 8, wherein the restriction level is an identification age of the user and wherein the inspect engine is configured to determine whether the visual content, or part thereof, is undesirable based on the identification age.

13. The system according to claim 8, wherein the identification server is configured to tag all subsequent content requests from the user device with the restriction identifier after identifying the user account.

14. The system according to claim 8, further comprising:

training the inspection engine using machine learning on datasets comprising digital content, and wherein the inspection engine dynamically improves its ability to classify digital content by adapting its analysis and decision-making based on exposure to new content during operational use.

* * * * *